June 20, 1950  J. D. FOWLER  2,512,057
SPRING SUSPENSION FOR AUTOMOTIVE VEHICLES
Filed Dec. 4, 1945  2 Sheets-Sheet 1
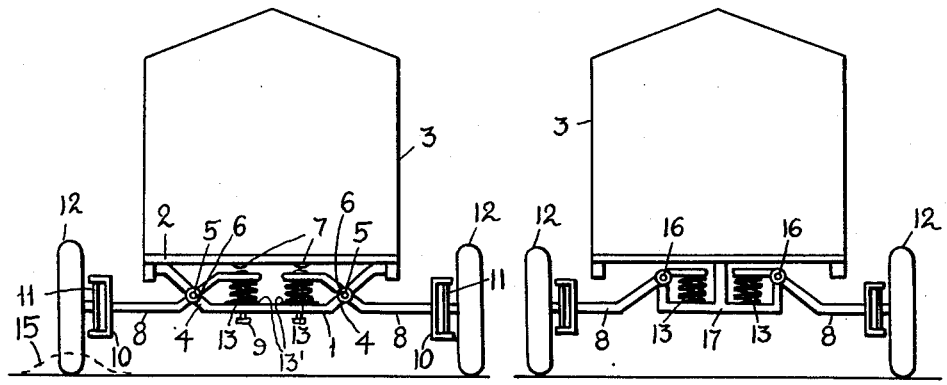
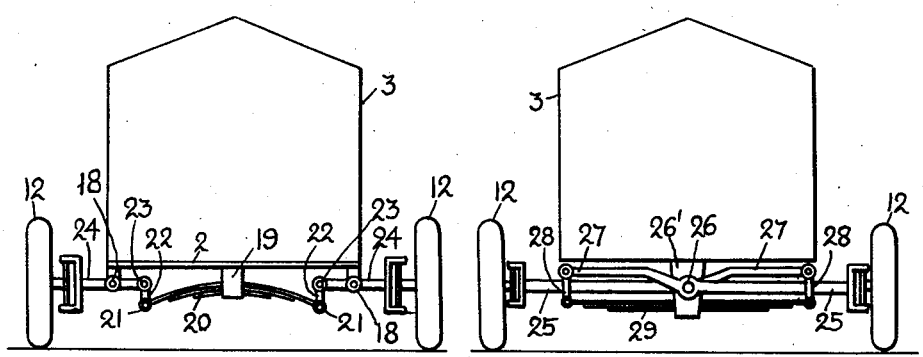
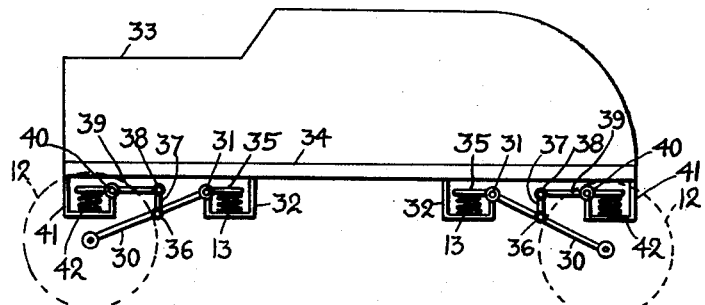
JOHN D. FOWLER
INVENTOR
ATTORNEY June 20, 1950            J. D. FOWLER            2,512,057

SPRING SUSPENSION FOR AUTOMOTIVE VEHICLES

Filed Dec. 4, 1945            2 Sheets-Sheet 2

John D. Fowler
INVENTOR

John P. Wilson
ATTORNEY

Patented June 20, 1950

2,512,057

UNITED STATES PATENT OFFICE 2,512,057

SPRING SUSPENSION FOR AUTOMOTIVE VEHICLES

John D. Fowler, New York, N. Y.

Application December 4, 1945, Serial No. 632,685

1 Claim. (Cl. 267—20)

My invention relates to spring suspension for automotive vehicles and has particular reference to the suspension of the front and rear wheels of an automotive vehicle.

In conventional automotive vehicles, the springs are interposed between the wheel and the vehicle so that vertical movements of the wheels transmit upward acting forces on the body of the vehicle, the springs merely modifying the character of the forces so as to reduce the sharp shocks and convert them into smooth upward movements. It is a well known fact that the springs do not absorb the movements or the energy but they store the energy and return the same to the body in a somewhat modified form, less violent than would be the case without any springs.

I have found that much better results are obtained when the springs are so constructed that the vertical upward movements of the wheels are transmitted to the springs in a downward direction, i. e., in the direction opposite to the direction of the movement of the wheels.

My invention has for its object therefore to provide a spring suspension in which the forces acting on the wheel as a result of its rolling movement over the road, are transmitted to the springs in a downward direction, thereby tending to reduce the vertical movements of the vehicle.

Another object of my invention is to provide a spring suspension of the character above indicated, in which the wheels are supported on pivoted levers in such a manner the vertical movements of the wheels, when travelling over obstructions on the road, can be increased without increasing the corresponding vertical movements of the vehicle, so that the vehicle can travel over very rough roads with comparatively little up and down movements.

The foregoing and other objects, features and advantages of my invention are more fully described in the accompanying specification and drawings in which—

Fig. 1 is a diagrammatic view of the front portion of a vehicle with my spring suspension in which helical springs are employed;

Fig. 2 is a similar view of a vehicle with a modified suspension;

Fig. 3 is a similar view of a suspension employing leaf springs;

Fig. 4 is a similar view of a modified leaf spring suspension;

Fig. 5 is an elevational view of a vehicle showing another modification of my spring suspension;

Figure 6:
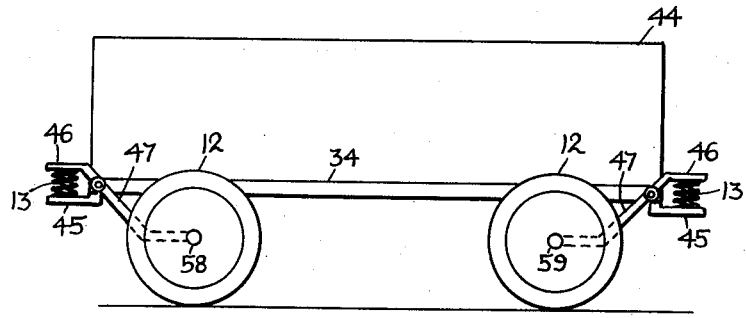
Fig. 6 is a similar view of still another modification.

My spring suspension as shown in Fig. 1 consists of a bracket 1 having a relatively flat middle portion and raised ends secured to a front cross member 2 of the chassis of a vehicle 3. The angular portions 4 of the bracket are provided with bearings 5 for short shafts 6 pivotally supporting axle portions 8 in the form of levers, the outer and preferably longer arms of the axles having forked ends 10 for supporting conventional spindles 11 of wheels 12. The shorter inner ends of the axles rest on the upper ends of helical springs 13, the lower ends of the springs resting on the bracket 1. Rubber bumpers 7 may be provided for absorbing rebound shocks. Plates 13' under the springs can be used to adjust the degree of compression.

The wheels are provided with a conventional steering gear such as is used with ordinary so-called "knee-action" spring suspension in which each wheel has an independent suspension.

With my spring suspension it is possible to proportion the relative length of the two lever arms of the axles as to obtain a large vertical displacement of the wheel as indicated in dotted lines in Fig. 1, when the wheel rides over an obstruction 15 on the road, also indicated in dotted lines, while the spring 13 is subjected to a relatively small deflection. The force acting on the spring is directed downwards, tending to reduce the upward movement of the vehicle. The rebound of the spring is also directed downwards, so that in either case the upward movement of the vehicle is reduced. Rods 9 with heads at both ends limit the rebound.

A modified suspension is shown in Fig. 2 in which the axles 8 are pivotally supported at 16 on the ends of a bracket 17 having the shape of an inverted T.

My suspension can also be used with leaf springs as shown in Fig. 3. A single leaf spring 20 is secured at the middle to the cross member 2 at 19 and is connected at 21 to the ends of pivoted links or shackles 22 whose other ends are pivotally connected at 23 to the ends of the wheel axles 24 pivoted at 18 to the end portions of the member 2.

A modified suspension is shown in Fig. 4. The axles 25 are relatively long and are pivoted at 26 to a common bracket 26'. The inner ends 27 of the axles are connected by links or shackles 28 to the ends of a central spring 29. With this arrangement each wheel transmits its pressure to the opposite side of the chassis, depressing the same downwards and thereby steadying the vehicle, such an action being especially useful on the curves for preventing the excessive tilting of the vehicle due to the centrifugal force.

Fig. 5 shows diagrammatically a modified spring suspension in which solid wheel axles can be used. The wheels 12 are supported at the ends of levers 30 pivotally supported at 31 on the ends of brackets 32 secured to the frame 34 of the chassis of a vehicle 33. Springs 13 support the inner ends 35 of the levers. The middle or intermediate portions of the levers are pivotally connected at 36 to links or shackles 37, the other ends of the links or shackles being pivotally connected at 38 to the outer ends of levers 39. The latter are pivotally supported at 40 on the ends of brackets 41 secured to the frame 34. The inner ends of the lever 39 rest on springs 42 supported on the brackets 41. A very soft and flexible suspension is thereby obtained, the load being distributed on two springs.

Fig. 6 shows a suspension for a trailer or car 44 with a single helical spring 13 for each wheel 12, each spring being placed between a bracket 45 at the end of the frame 34 and the end 46 of a lever 47 supporting axles 58, 59 of the wheel 12.

Figure 7:
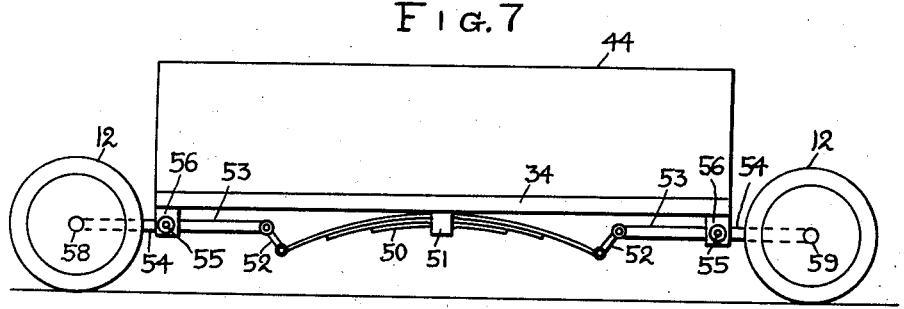
Fig. 7 is a diagrammatic elevational view of a modification in which leaf springs are employed in connection with my spring suspension.

A spring suspension using a single leaf spring 50 is shown in Fig. 7. The middle portion of the spring is secured at 51 to the frame 34 of a car 44, and the ends of the spring are connected by pivoted links or shackles 52 to the inner ends 53 of levers or axles 54. The middle portions of the levers rotate on pivots 55 on brackets 56 depending from the frame 34 and the outer ends of the levers support the wheel axles 58, 59. A single spring is used for both, the front and the rear wheels at one side of the chassis.

Figure 8:
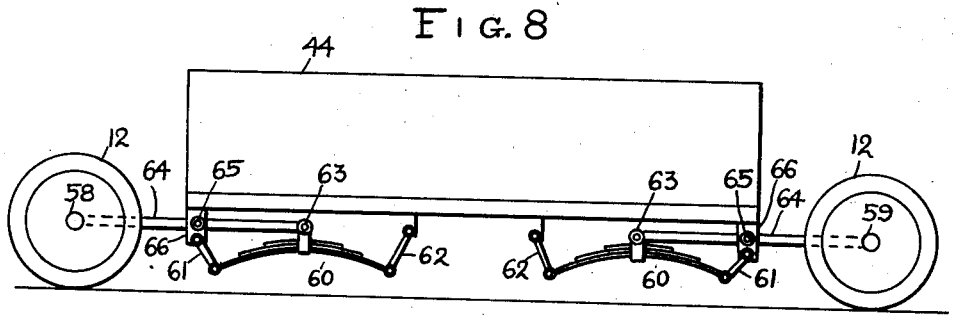
Fig. 8 is a similar elevational view of still another modification employing leaf springs.

In Fig. 8 a system is shown in which each wheel has a separate spring 60, suspended at the ends on pivoted links or shackles 61, 62 and pivotally connected in the middle at 63 to the end of a lever or axle 64. The latter is pivotally supported at 65 on a bracket 66 depending from the frame 34.

Figure 9:
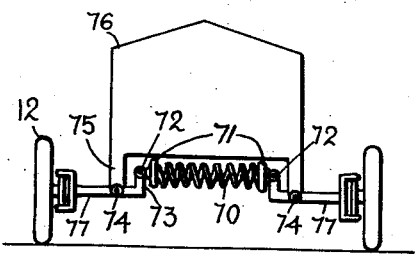
Fig. 9 is a front view of a modified suspension.

A modified suspension is shown in Fig. 9 in which a single horizontal helical spring 70 is employed. It is supported between end caps 71 pivotally connected at 72 to the inner ends 73 of crank levers pivotally supported at 74 on lugs or brackets 75 extending from the body 76. Wheels 12 are mounted in a usual manner at the ends of the outer legs 77 of the crank levers.

My spring suspension reduces the vertical upward movements of the vehicle, since the pressure of the wheel as transmitted by the spring is directed downward. Moreover, the unsprung weight of the wheels and axle is reduced since it does not include the weight of the springs.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claim to cover all such changes and modifications.

What is claimed as new and desired to be secured by Letters Patent is:

A spring suspension for the wheels of a vehicle comprising a pair of brackets for each wheel; a lever having an inner arm and an outer arm rotatively supported on one of the brackets; means to rotatively support the wheel on the outer arm of the lever; a spring interposed between the inner arm of the lever and said one bracket, said spring being disposed below said inner arm so that the pressure of the wheel is transmitted to the spring in a downward direction; a second lever having an inner arm and an outer arm rotatively supported on the second bracket; means to pivotally connect the outer arm of the second lever to the first lever; and a second spring interposed between the inner arm of the second lever and the second bracket.

JOHN D. FOWLER.

REFERENCES CITED

The following references are of record in the file of this patent:

UNITED STATES PATENTS

| Number | Name | Date |
| --- | --- | --- |
| 1,206,360 | Olsen | Nov. 28, 1916 |
| 1,212,987 | Morrow | Jan. 16, 1917 |
| 1,898,567 | O'Connor | Feb. 21, 1933 |
| 2,043,889 | Erb | June 9, 1936 |
| 2,164,602 | Valletta | July 4, 1939 |
| 2,260,634 | Mullner | Oct. 28, 1941 |

FOREIGN PATENTS

| Number | Country | Date |
| --- | --- | --- |
| 481,006 | Great Britain | Mar. 3, 1938 |
| 537,401 | France | Mar. 3, 1922 |
| 596,363 | France | Aug. 8, 1925 |
| 772,053 | France | Aug. 6, 1934 |